United States Patent [19]

Lilly, Jr. et al.

[11] 4,410,785

[45] Oct. 18, 1983

[54] METHOD AND APPARATUS FOR PERFORATION OF SHEET MATERIAL BY LASER

[75] Inventors: A. Clifton Lilly, Jr., Richmond; Warren E. Claflin, Bon Air; Edward B. Stultz, Richmond; Ulysses A. Brooks, Glen Allen; Peter Martin, Richmond, all of Va.

[73] Assignee: Philip Morris Incorporated, New York, N.Y.

[21] Appl. No.: 317,058

[22] Filed: Nov. 2, 1981

Related U.S. Application Data

[63] Continuation of Ser. No. 31,073, Apr. 18, 1979, abandoned, which is a continuation of Ser. No. 913,466, Jun. 7, 1978, abandoned.

[51] Int. Cl.³ .............................................. B23K 27/00
[52] U.S. Cl. .................... 219/121 LK; 219/121 LL; 219/121 LR; 219/121 LT
[58] Field of Search ............... 219/121 LK, 121 LL, 219/121 LR, 121 LP, 121 LS, 121 LT, 121 LW

[56] References Cited

U.S. PATENT DOCUMENTS

| | | | |
|---|---|---|---|
| 2,012,352 | 8/1935 | Rusting et al. | 352/206 |
| 2,547,623 | 4/1951 | Cockrell | 346/33 |
| 2,844,648 | 7/1958 | Rosenthal | 358/293 |
| 2,875,017 | 2/1959 | Reynolds | 346/109 |
| 2,930,669 | 3/1960 | Licklider | 346/109 |
| 3,022,704 | 2/1962 | Cary | 356/324 |
| 3,154,371 | 10/1964 | Johnson | 346/108 |
| 3,175,196 | 3/1965 | Lee, Jr. et al. | 340/173 |
| 3,220,013 | 11/1965 | Harris | 346/107 |
| 3,226,527 | 12/1965 | Harding | 219/384 |
| 3,256,524 | 6/1966 | Stauffer | 219/121 LK |
| 3,262,122 | 7/1966 | Fleisher et al. | 346/1 |
| 3,303,739 | 2/1967 | Chitayat | 350/132 |
| 3,314,073 | 4/1967 | Becker | 346/76 |
| 3,325,819 | 5/1967 | Fraser | 346/76 |
| 3,348,233 | 10/1967 | Hertz | 346/76 |
| 3,389,403 | 6/1968 | Cottingham et al. | 346/108 |
| 3,463,898 | 8/1969 | Takaoka et al. | 219/121 L |
| 3,474,457 | 10/1969 | Becker | 346/76 |
| 3,482,254 | 12/1969 | Harrison et al. | 346/76 |
| 3,524,046 | 8/1970 | Brouwer | 219/384 |
| 3,528,424 | 9/1970 | Ayres | 128/303.1 |
| 3,537,306 | 11/1970 | Bedinger | 73/170 |
| 3,543,183 | 11/1970 | Heimann | 350/266 |
| 3,619,028 | 11/1971 | Keene | 350/285 X |
| 3,622,740 | 11/1971 | Ravussin et al. | 219/121 L |
| 3,658,422 | 4/1972 | Wilkinson | 356/89 |
| 3,787,121 | 1/1974 | Lowy et al. | 356/93 |
| 3,819,277 | 6/1974 | Berthelot et al. | 356/204 |
| 3,826,578 | 7/1974 | King et al. | 356/237 |
| 3,838,912 | 10/1974 | Arimoto et al. | 350/285 |
| 3,901,601 | 8/1975 | Lahmann | 356/97 |
| 3,943,324 | 3/1976 | Haggerty | 219/121 L |
| 3,985,420 | 10/1976 | Grose | 350/7 |
| 3,993,402 | 11/1976 | Fredrick, Jr. | 350/286 |
| 4,083,629 | 4/1978 | Kocher et al. | 219/121 L X |
| 4,115,683 | 9/1978 | Clark et al. | 219/121 L |
| 4,118,619 | 10/1978 | McArthur | 219/121 LK |
| 4,121,595 | 10/1978 | Heitmann et al. | 219/121 L X |
| 4,125,755 | 11/1978 | Plamquist | 219/121 L |
| 4,153,369 | 5/1979 | Kallet et al. | 356/318 |
| 4,218,606 | 8/1980 | Whitman | 219/121 L |

FOREIGN PATENT DOCUMENTS

| | | |
|---|---|---|
| 2828754 | 2/1979 | Fed. Rep. of Germany . |
| 2754104 | 6/1979 | Fed. Rep. of Germany . |
| 2320918 | of 0000 | France . |
| 2379992 | of 0000 | France . |
| 2399374 | of 0000 | France . |
| 2439643 | of 0000 | France . |
| 103363 | of 0000 | Japan . |
| 51-134996 | 11/1976 | Japan . |
| 53-11786 | 3/1978 | Japan . |
| 7514132 | of 0000 | Netherlands . |
| 925798 | 5/1963 | United Kingdom . |
| 1368819 | 10/1974 | United Kingdom . |
| 1455327 | 11/1976 | United Kingdom . |
| 2015813 | 9/1979 | United Kingdom . |
| 2032325A | 5/1980 | United Kingdom . |

OTHER PUBLICATIONS

N. B. Seebe, *IBM Technical Disclosure Bulletin*, "Light Scanners", vol. 16, No. 6, pp. 1964–1966, Nov. 1973.

J. G. Belleson, *IBM Technical Disclosure Bulletin*, "Scanning Method Employing Multiple Flying Spots Per Field", vol. 15, No. 5, pp. 1479–1480, Oct. 1972.

Grimm, M. A. "Optical System for Laser Machining of

Narrow Slots," *IBM Tech. Disc. Bull.*, vol. 14, No. 9, Feb. 1972, pp. 2641-2642.
Klauser, H. E ., "Laser Micromachine," *IBM Tech. Disc. Bull.*, vol. 21, No. 11, Apr. 1979, pp. 4431-4432.
Kremen, S. H. "Prism Deflector for Laser Machining," *IBM Tech. Disc. Bull.*, vol. 8, No. 6, Nov. 1965, p. 882.

*Primary Examiner*—C. L. Albritton
*Attorney, Agent, or Firm*—Robert M. Shaw

[57] ABSTRACT

In providing perforation uniformity both in the spacing between multiple rows of perforations in sheet material and in the spacings among perforations within each row, a common laser beam is shared among the rows, being directed to the sheet material through a common focusing element for each adjacent pair of rows. In conducting the laser beam to each such common focusing element, a pair of modified beams is derived from the laser beam, each modified beam having light ray content divergent about an axis of symmetry thereof which is parallel to the optical axis of the focusing element.

12 Claims, 7 Drawing Figures

METHOD AND APPARATUS FOR PERFORATION OF SHEET MATERIAL BY LASER

This is a continuation of application Ser. No. 31,073, filed Apr. 18, 1979, now abandoned which, in turn, is a continuation of application Ser. No. 913,466, filed June 7, 1978, abandoned.

FIELD OF THE INVENTION

This invention relates generally to perforating material by the use of light energy and pertains more particularly to the provision of spatially precise matrices of perforations in sheet material.

BACKGROUND OF THE INVENTION

In perforating sheet material, a two-dimensional hole matrix is frequently sought with rigorous limits on perforation spacing uniformity as between rows and columns of the matrix. An illustrative field of current interest is that of perforating cigarette filter tipping paper, where hole matrix uniformity enables consistency of cigarette dilution characteristics. In various known mechanical puncture and electric arc perforating practices, row spacing is rendered precise by providing an individual perforating device for each row. Uniformity in the spacing of perforations made in each row, and hence precise column spacing is achieved by synchronizing operation of each perforating device. Since the perforating devices, e.g., pin or electrode pair, are physically limited in size, these practices can readily accommodate quite close spacing of adjacent rows of the matrix.

The prior art has also encompassed perforating practices involving lasers providing pulsed or continuous light energy in row-column perforation. In these efforts, however, there generally has been an apparent preference, for economic and physical size reasons, for use of a single laser serving both row and column perforation. Known single laser practices of type affording spacing uniformity have involved the splitting of the laser beam into plural beams, one for each row, and the focusing of light onto a sheet member by use of an individual lens for each row. Spacing of perforations by precise limits within each row has been sought by inclusion of a movable reflective element in each of the plural beam paths. Complexity attends precision movement, e.g., vibration or pivoting, of such reflective element into and out of its reference plane, to uniformly locate holes in rows, and the present state of the art is accordingly limited.

The foregoing prior art practices and references illustrating same and other practices are further discussed in the statement filed herein pursuant to 37 CFR 1.97 and 1.98.

SUMMARY OF THE INVENTION

The present invention has, as its primary object, the provision of improved methods and systems for perforating sheet material by the use of light energy.

A more particular object of the invention is to provide for expeditious perforation of cigarette filter tipping paper by laser.

In attaining these and other objects, methods of the invention provide for the making of a row-column matrix of perforations in sheet material wherein perforations in adjacent rows of the matrix are made by conducting spaced beams of light through a common focusing means, the virtual object or origin locations of such beams being spaced from one another to achieve the desired spacing between such adjacent rows. The spacing between perforations within each row is determined in part by the rate of occurrence of the beam of light serving to perforate such row, and uniformity in spacing is attained by maintaining constant such occurrence rate and the speed of sheet material transport.

In a particularly preferred embodiment, the system of the invention employs reflecting elements which are rotated through a laser output beam, the reflective elements being supported in such angular disposition and so configured as to provide for reflection of modified beams of light energy, each of which diverges with respect to an axis of symmetry thereof, which is parallel to the optical axis of a lens used for collection of pairs of such modified light beams. Reflective element rotational speed, sheet material transport speed and collective positioning of the reflective elements with respect to the sheet material are selected to realize intended perforation matrix characteristics.

The foregoing and other objects and features of the invention will be further understood from the following detailed description of preferred methods and systems and from the drawings wherein like reference numerals identify like parts throughout.

DESCRIPTION OF PREFERRED METHODS AND EMBODIMENTS

Figure 1:
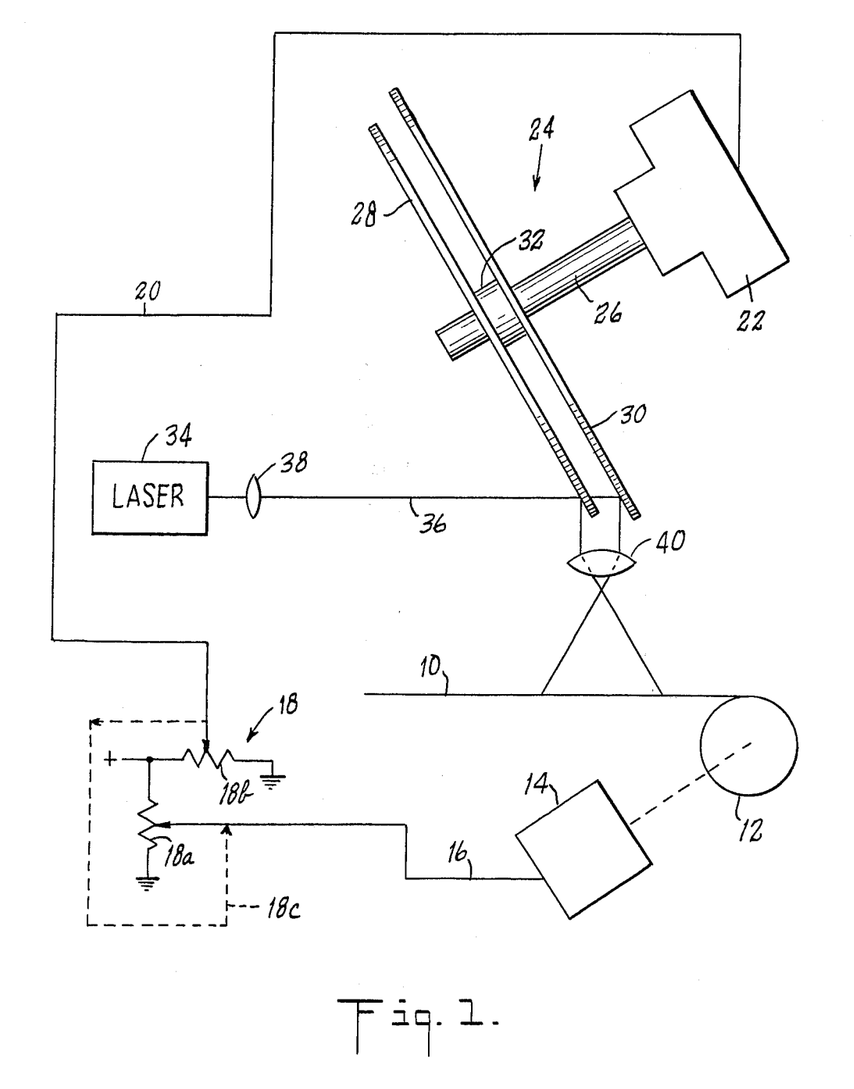
FIG. 1 is a block diagrammatic showing of a preferred system embodiment.

Referring to FIG. 1, a web 10 of sheet material is collected by take-up drum 12 following horizontal transport from a payout drum, not shown. Take-up drum 12 is rotated by drive unit 14 with drum speed being established by a control signal on line 16 as furnished by potentiometer 18a of system controller 18.

Controller 18 applies a further signal, from potentiometer 18b, to line 20 for control of drive unit 22 of light-reflector assembly 24, which comprises shaft 26, rotated by drive unit 22, light-reflective discs 28 and 30 and spacer 32, keyed to shaft 26 with the discs for rotation therewith.

Laser 34 generates a continuous output beam 36 which is focused by lens 38 at a location adjacent discs 28 and 30. Light beams reflected by the discs are conducted by a common focusing element, shown as lens 40, to web 10.

Figure 2:
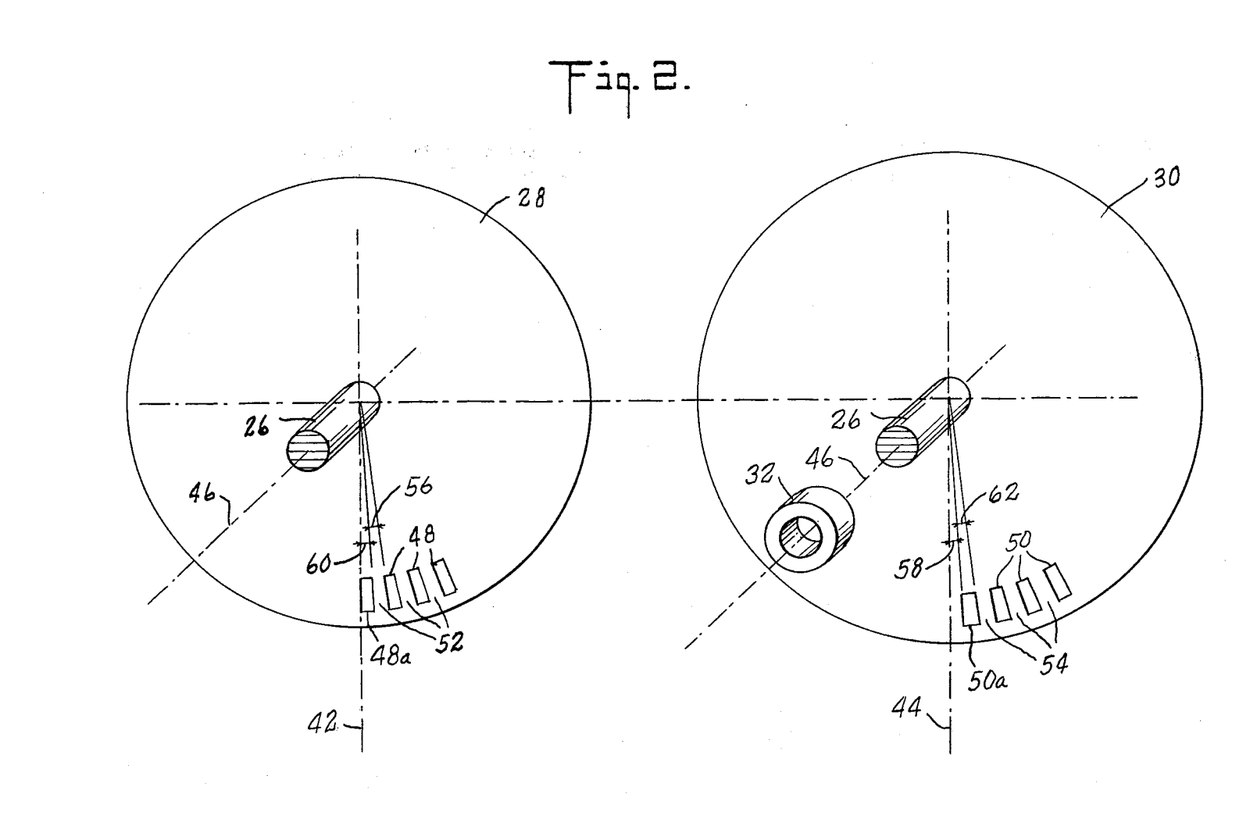
FIG. 2 is a perspective view of the reflective discs of FIG. 1, the discs being shown side-by-side for purposes of explanation.

FIG. 2 shows in side-by-side perspective disc 28 and disc 30, as the latter would be seen rightwardly of disc 28 in FIG. 1. The discs are keyed to shaft 26 in position wherein lines 42 and 44 are in a common plane with shaft axis 46. In the illustrative embodiment wherein two discs are used and are intended to confront beam 36 (FIG. 1) alternately, the discs have light-transmissive uniformly spaced peripheral portions 48 and 50 which are mutually staggered, defining reflective facets 52 and 54 therebetween. Forty-five such facets are typically employed with each facet subtending four degrees of arc (angles 56 and 58) and each transmissive portion also subtending four degrees of arc (angles 60 and 62). With transmissive portion 48a having its leading edge aligned with line 42 and transmissive portion 50a spaced from line 44 by facet angle 58, the discs are properly aligned for alternate reflection of the laser beam, the beam passing through transmissive portion 48a to be reflected by the facet clockwise of transmissive portion 50a. The light-transmissive portions are typically openings in the discs of size sufficient to freely pass the laser beam. Spacer 32 may be selected of extent along axis 46 to space discs 28 and 30 to modify the origin location of modified beams reflected by the disc facets, for purposes explained hereinafter. While disc 30 might be constructed with no light-transmissive portions since it is the last disc from the laser, the described construction mitigates against spurious reflection of the laser output beam by disc 30 during confrontation of facets of disc 28 with the laser beam, i.e., laser output beam spillage beyond disc 28 simply passes through disc 30 openings. In this respect, such beam spillage may be desired in applications wherein different spacing lengths are required in adjacent rows and beam usage is not strictly alternate as in the practice under discussion.

Figure 3:
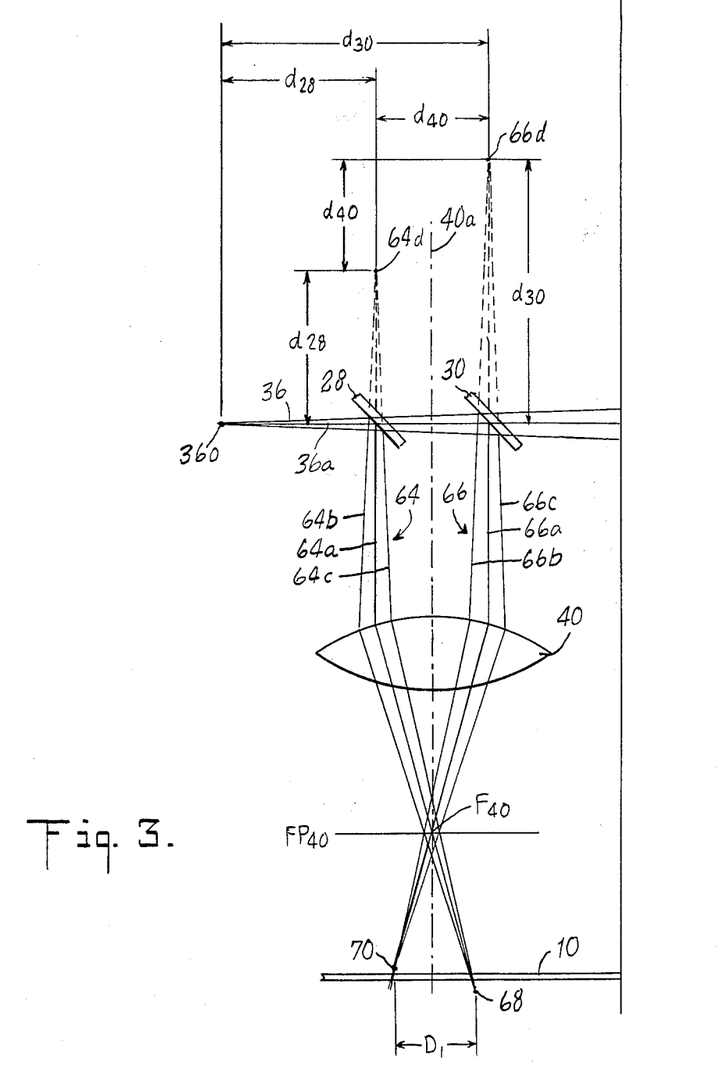
FIG. 3 is an optical diagram applicable to the FIG. 1 system.

Referring to FIG. 3, each confrontation of a facet of disc 28 with beam 36 will give rise to the propagation of a modified version of the laser output beam, such modified beam being shown at 64 and having central axis 64a, i.e., axis of symmetry, which is made parallel to the optical axis 40a of lens 40 by the orientation of disc 28. Beam 64 has outer rays 64b and 64c, which diverge respectively oppositely from beam central axis 64a. The virtual object or origin location of beam 64 is shown at 64d. Where beam 36 converges and then diverges between discs 28 and 30, the beam is then convergent as to disc 28, and modified beam 64 will be convergent at the outset and then divergent.

Lens 40 also has within its field of view the facets of disc 30 and hence collects further modified versions of laser output beam 36 on each confrontation of a facet of disc 30 with beam 36. Such further modified beam 66 has central axis 66a (axis of beam symmetry) also made parallel to lens optical axis 40a and has divergent outer rays 66b and 66c and has virtual object or origin location 66d.

While modified beam rays coincident with axes 64a and 66a will come to focus with rays coincident with lens optical axis 40a or other axes parallel thereto, at lens 40 focal point $F_{40}$, the divergent contents of modified beams 64 and 66 come to focus outwardly of focal plane $FP_{40}$ at locations 68 and 70. Such locations are at different distances outwardly of lens 40, based on the difference ($d_{40}$) in the distances of discs 28 and 30 from the divergence origin $36_0$ of beam 36. The virtual object location 64d of origin $36_0$ for disc 28 is at the same distance ($d_{28}$) from disc 28 as is origin $36_0$. The virtual object location 66d of original $36_0$ for disc 30 is likewise at the same distance ($d_{30}$) from disc 28 as is origin $36_0$. Such distance $d_{40}$ between discs 28 and 30 determines the distance $D_1$ between locations 68 and 70, when taken with the respective ratios (a) of the distance between the center of lens 40 and disc 28 to the distance between the center of lens 40 and location 68 and (b) of the distance between the center of lens 40 and disc 30 to the distance between the center of lens 40 and location 70.

In practice in accordance with the invention, discs 28 and 30 are spaced from one another such that energy reflected by disc 30 clears the lower extremity of disc 28 or passes through disc 28 openings and does not impinge thereon to be interfered with. As for an outer limit of spacing of discs 28 and 30, the same is constrained by the requirement that energy reflected by both discs be incident on lens 40. Further, disc spacing is selected so as to provide sufficient mutual proximity of locations 68 and 70 along lens axis 40a to permit placement of web 10 in close disposition to each location, as shown in FIG. 3, wherein the web is juxtaposed tightly between locations 68 and 70.

Beam axis 36 and shaft 26 are positioned at a common acute angle to the FIG. 3 plane and lens optical axis 40a is moved through such angle outwardly of the FIG. 3 plane. Web 10 has a marginal edge coincident with the FIG. 3 plane. Operation of the system then gives rise to a first row of perforations created by modified beam 64 at locations 68 and a second perforation row spaced therefrom and created by modified beam 66 at locations 70. Such practice will be understood further by detailed consideration of an expanded system embodiment, shown and explained in FIGS. 4-7.

Figure 4:
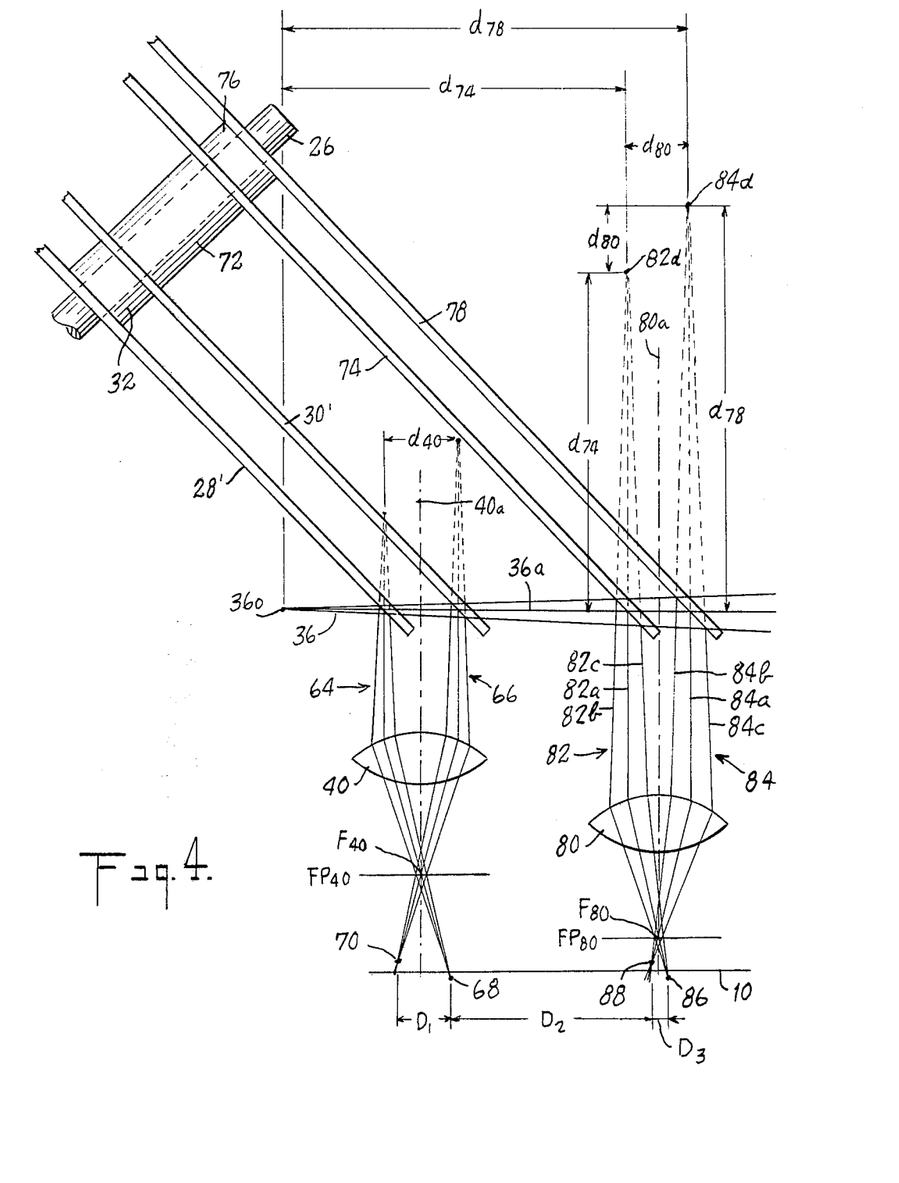
FIG. 4 is an optical diagram applicable to the FIG. 1 system as expanded to include additional reflective discs.

In FIG. 4, four reflective discs, 28', 30', 74 and 78, are spaced along shaft 26 by spacers 32, 72 and 76. An additional focusing element for modified beams is shown as lens 80. Modified beams 82 and 84 are propagated respectively by the facets of discs 74 and 78. Modified beam 82 has central symmetry axis 82a, outer divergent rays 82b and 82c and virtual object or origin location 82d. Axis 82a is made parallel to optical axis 80a of lens 80. Modified beam 84 has central symmetry axis 84a, outer divergent rays 84b and 84c and virtual object or origin location 84d. Axis 84a is made parallel to lens optical axis 80a. While modified beam 82 and 84 rays coincident with axes 82a and 84a will come to focus with rays coincident with lens optical axis 80a or other axes parallel thereto, at lens focal point $F_{80}$, the divergent contents of modified beams 82 and 84 come to focus outwardly of focal plane $FP_{80}$ at locations 86 and 88. Such locations are at different distances outwardly of lens 80, based on the difference ($d_{80}$) in the distances ($d_{74}$ and $d_{78}$) of discs 74 and 78 from divergence region $36_0$ of beam 36. Lens 80 is located downwardly of lens 40 to force the above-noted ratios (a) and (b) for lens 80 and discs 74 and 78 to values which accommodate the disposition of focus locations 86 and 88 generally in common disposition with locations 68 and 70. Web 10 is thus in general juxtaposition with all of locations 68, 70, 86 and 88. Distance $D_3$ is determined by distance $d_{80}$ and the ratios (a) and (b) for lens 80 and discs 74 and 78. A further distance $D_2$, of significance discussed below, exists between locations 68 and 88.

Figure 5:
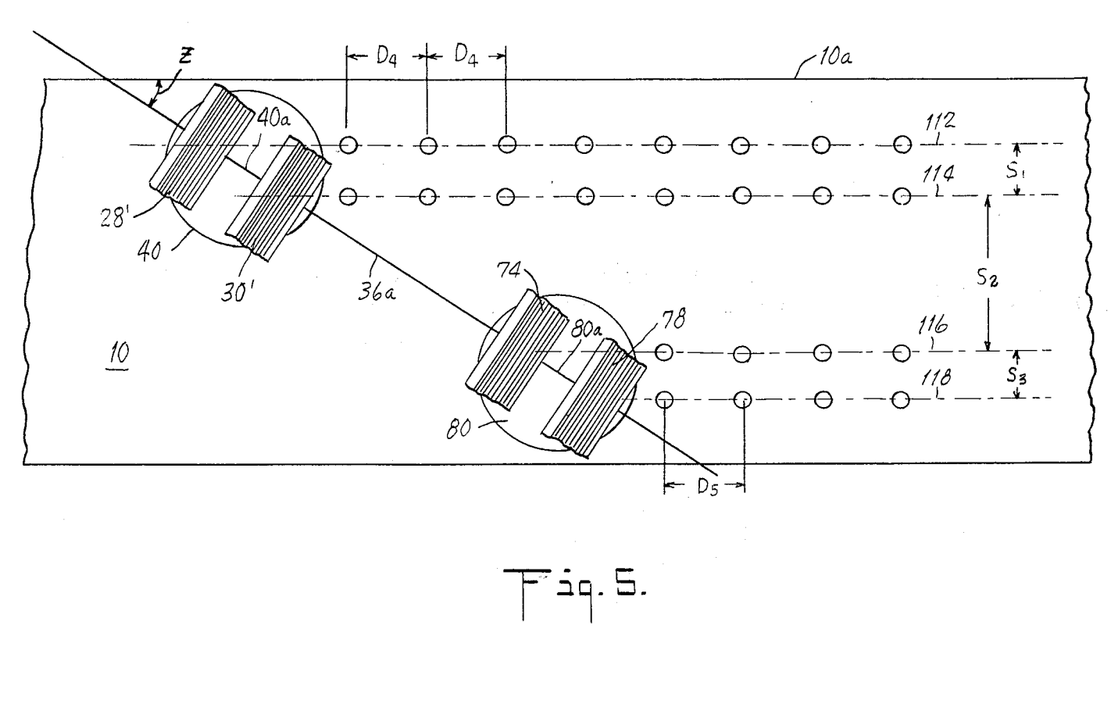
FIG. 5 is a plan elevation of such expanded system.

In FIG. 5, the plane of FIG. 4 is orthogonal to web 10 and coincident with web margin 10a and laser output beam axis 36a makes acute angle Z therewith. The axis of shaft 26 is in a common plane with beam axis 36a orthogonal to web 10. By setting of system parameters as also discussed below, the illustrated four row-column matrix may be reached with column spacings $D_4$ and $D_5$ applicable to respective upper and lower adjacent row pairs and spacings $S_1$–$S_3$ applicable as between the rows.

Figure 6:
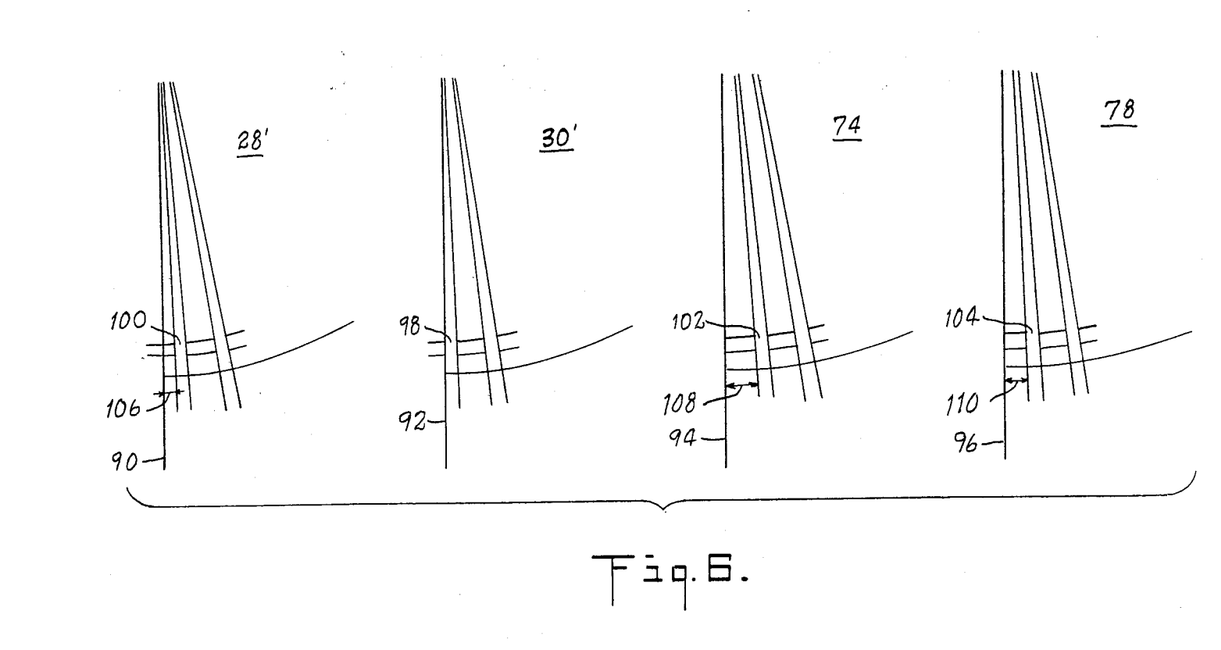
FIG. 6 shows the respective configurations of the reflective discs of the expanded system.

FIG. 6 shows the configurations of discs 28', 30', 74 and 78. With all discs keyed to common plane keying lines 90, 92, 94 and 96, and assuming forty-five facets per disc as in the system of FIGS. 1-3, facets of all discs each subtend two degrees of arc and openings thereof each subtend six degrees of arc. Facet 98 of disc 30' has its leading clockwise edge coincident with keying line 92. Facets 100, 102 and 104 of discs 28', 74 and 78, have their leading clockwise edges spaced from keying lines 90, 94 and 96 respectively by two, six and four degree angles 106, 108 and 110. By this configuration, it will be seen that clockwise rotation of shaft 26 will give rise to successive propagation of modified beams 66, 64, 84 and 82 (FIG. 4). Such firing order is chosen for convenience of explanation since it gives rise to time-successive perforations in rows 112, 114, 116 and 118 of FIG. 5. The firing order can be changed, as desired, from such convenient order. As noted for the two disc embodiment above, the last successive disc may be arranged without light-transmissive portions, but same are preferred to mitigate against spurious light energy reflections from such last disc. The laser beam is focused to its divergence origin $36_0$ (FIG. 4), such that the beam cross-section clears the openings of the penultimate disc (disc 74), thereby assuring that the full beam can be incident on each disc.

Figure 7:
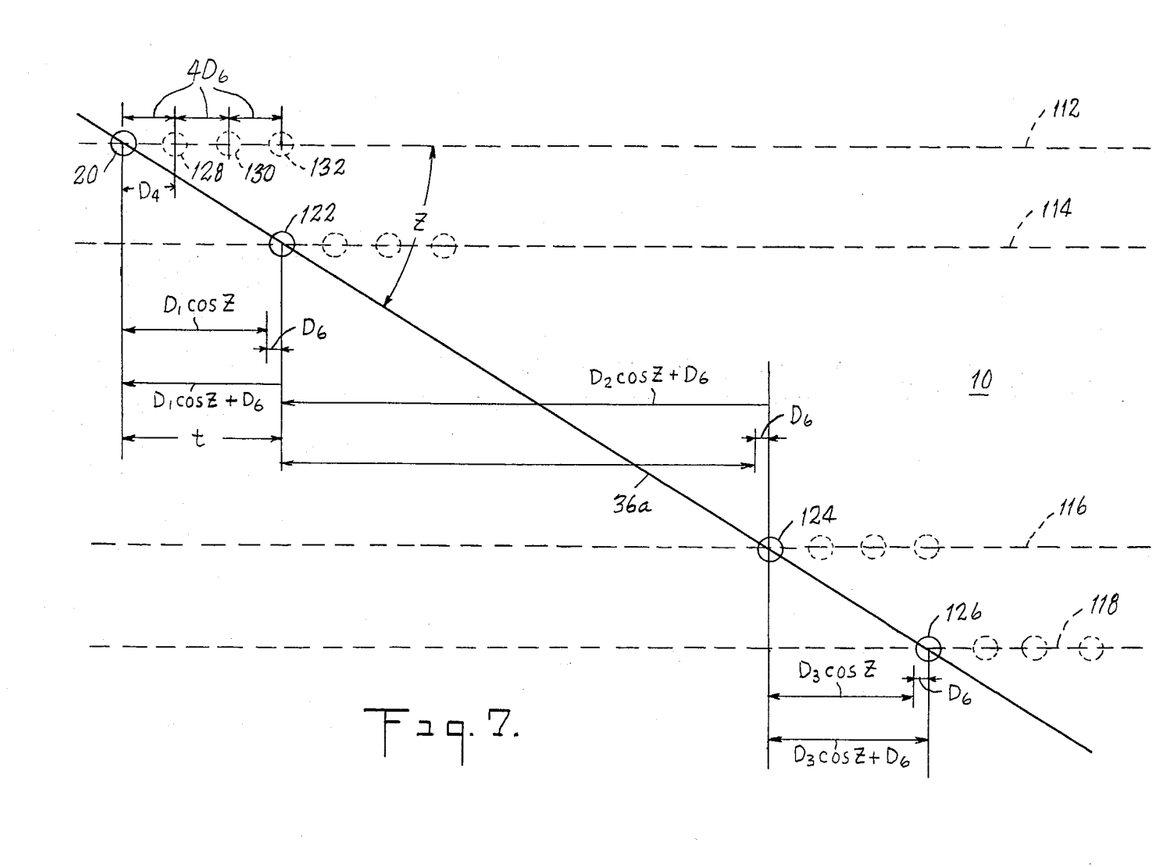
FIG. 7 is a geometric drawing explanatory of perforating activities with the expanded system set as in FIG. 5.

FIG. 7 shows four solid line perforations 120, 122, 124 and 126 made in time succession. The time spacing between each successively made perforation is readily calculated since the propagation rate of modified beams is determined solely by reflector assembly parameters, i.e., for one revolution of shaft 26 in the given embodiment, four times forty-five, or one hundred eighty, modified beams are propagated. The time spacing (t) between successively-made perforations, i.e., perforations 120 and 122, is thus 1/180R, where R is the number of revolutions of shaft 26 per unit time.

Perforations 120 and 122 are spaced in distance by the measure (FIG. 7) $D_1 \cos Z$ plus $D_6$. $D_1$ is the spacing in the FIG. 4 plane between the perforations 120 and 122, with web 10 stationary. The cast image separation of $D_1$ is greater in FIG. 7, based on angle Z and is the measure $D_1 \cos Z$. $D_6$ represents the distance travelled by web 10 during the interperforation time period (t) and is simply web speed (distance travelled per unit time) multiplied by t, derived as above. Since perforations in row 112 are all made at the same location (70—FIG. 4) with respect to lens 40, and do not have cast image spacing, they may all be spaced by a distance ($D_4$) which is shown as being fractional to the spatial measure $D_1 \cos Z$ plus $D_6$, and a multiple of $D_6$ times the number of discs.

In the FIG. 7 example, on rightward movement of web 10, row 112 perforations 128 and 130 are made spatially prior to, and row 112 perforation 132 is made spatially coincident with, row 114 perforation 122, but later in time than row 114 perforation 122. Such phenomena is attributable to the combined effects of cast image separation as between time-successive perforations and angle Z.

One may define a number N indicating the number of row 112 perforations made spatially prior (or coincident with) and timewise later than the row 114 perforation made time successive to an initial row 112 perforation, and establish the following relation, for a four disc arrangement:

$$N D_4 = D_1 \cos Z + 6 \qquad (1)$$

$$N = (D_1 \cos Z + D_6)/D_4 \qquad (2)$$

or $$D_1 \cos Z = D_4 N - D_6 \qquad (3)$$

or $$D_1 = (D_4 N - D_6)/\cos Z \qquad (4)$$

In the given instance, N is three and $D_4$ is four times $D_6$. In such instance:

$$D_1 = 11 D_6 / \cos Z \qquad (5)$$

In expression (4) with $D_1$, Z and N preselected constants, $D_4$ and $D_6$ may be established as mutually variable to affect the same pattern. Since $D_4$ is proportional to t and since $D_6$ is determined by web speed, one may establish a series of respective values for drive unit 22 (reflector assembly speed, line 20 signal of FIG. 1) and drive unit 14 (web transport speed, line 16 of FIG. 1) which will yield the FIG. 7 configuration for rows 112 and 114. Control input 18c may adjust the wiper positions of pots 18a and 18b in common, as shown in FIG. 1.

The number N is integral in the foregoing example and is selected as the number three. Any integer may be selected to provide for column perforation registry. Lower values of N, i.e., lesser perforations in row 112 between time successive (row 112–row 114) perforations will give rise to a lesser number of perforations per unit distance in web 10. Conversely, higher values of N will increase perforation density in the web.

If N is selected to be non-integral, the above-noted column registration is not provided. By way of example, if N is selected as three and one-half, perforation density as between rows 112 and 114 decreases from the N equals three situation and the perforations in rows 112 and 114 are mutually uniformly staggered, i.e., are 180° out of phase, as is the case will all N values which have a one-half fractional part.

In the N equals three situation above, column registry in rows 116 and 118 also applies, and column registry as among all of rows 112 through 118 may be achieved by making $D_2 \cos Z$ plus $D_6$ an integral multiple of $D_6$ times the number of discs and by making $D_3$ equal to $D_1$. On the other hand, non-uniform matrices may be achieved by other parameter selections however, with consistency of both row spacing uniformity and uniformity in intrarow perforation spacing. The spacing parameters may likewise be modified to compensate for optics aberrations to attain desired perforation matrices.

The illustrated arrangement using a continuous laser and common shaft reflector assembly, having reflective elements in a circular locus rotated through the laser beam, is particularly preferred for generation of spatially separated modified beams having beam symmetry axes parallel to the optical axis of a lens common to adjacent modified beams. Other arrangements will now be evident to those skilled in the art, such as those employing pulsed lasers or chopping of a continuous beam. As will also be clear, beams in number greater than two may be collected by a common focusing element, giving rise to a corresponding number of perforation rows greater than the two rows obtained in the illustrated practice for each lens. Various other modifications in the foregoing practices and changes in the described systems may also be introduced without departing from the invention. The particularly described and discussed methods and embodiments are thus intended in an illustrative and not in a limiting sense. The true spirit and scope of the invention is set forth in the following claims.

What is claimed is:

1. A method of making plural spaced rows of spaced perforations in sheet material comprising the steps of:
   (a) projecting a beam of light energy and focusing said projected beam;
   (b) successively intercepting said focused beam at respective different locations along its axis and redirecting said beam from each such location as a modified beam, said modified beams each being divergent about an axis of symmetry parallel, initially, to the axes of symmetry of the other modified beams, said modified beams redirected from said different locations having unequal cross-sectional expanse;
   (c) establishing a common lens for at least each two adjacent modified beams at a position beyond the location at which said projected beam is focused, the parallel axes of symmetry of said modified beams being parallel, at incidence, to the optical axis of said common lens;
   (d) collecting said adjacent modified beams having parallel axes of symmetry exclusively in said common lens and disposing said sheet material in a location juxtaposed with the locations at which said modified beams are focused by said common lens, said focus locations of said modified beams being at different distances outward of said common lens so that as said sheet material is conveyed past said focus locations the successive interception of said focused beam results in spaced plural rows of spaced perforations in said sheet material.

2. The method of claim 1 wherein step (b) is practiced by the use of first and second light-reflective means for each pair of adjacent modified beams moved respectively alternately into confronting relation to said projected beam at said respective different locations.

3. The method of claim 2 wherein each of said first and second light-reflective means comprises a plurality of light-reflective elements disposed in mutually spaced relation in a circular locus, said step (b) being further practiced by rotation of each such circular locus through said projected beam about a rotational axis in intersecting relation with such beam axis.

4. The method of claim 2 wherein step (c) is practiced by disposing said common lens in such position that its field of view is inclusive of each of said respective different locations along such projected beam axis.

5. The method of claim 4 wherein step (d) is practiced by disposing said sheet material in a plane location outwardly of the focal point of said common lens.

6. The method of claim 1 wherein step (b) is further practiced by spacing said respective different locations from one another in accordance with preselected spacing between adjacent rows of perforations in said sheet material.

7. The method of claim 1 wherein step (a) is practiced by use of a continuous laser beam.

8. The method of claim 1 wherein step (b) is practiced in part by predetermining a rate for such successive interceptions of said projected beam in accordance with preselected spacings of perforations made within said rows.

9. The method of claim 8 wherein sheet material is transported during perforation thereof, the speed of transport of said sheet material being predetermined with such projected beam interception rate in accordance with preselected spacings of perforations made within said rows.

10. A system for providing a matrix of spaced perforations in sheet material, comprising:
    (a) source means for generating a continuous laser beam;
    (b) light-reflective means for successive confrontation with said laser beam at mutually different locations along the axis of said beam for generation of first and second divergent beams having respective mutually parallel axes of symmetry at generation and unequal cross-sectional expanse, said means comprising first and second light-reflective disc members coaxially mounted on a shaft for rotation such that the discs intercept the beam axis, said first disc being located intermediate the source means and the second disc, and defining a plurality of light-reflective facets located at angularly spaced common radial positions about said shaft such that said facets rotate through the beam axis and light-transmissive portions separating successive facets, said second disc being light reflective and disposed relative to said first disc such that light transmitted by said light-transmissive portions is reflected by said second disc;
    (c) focusing means for the laser beam disposed between said laser and said first disc;
    (d) a focusing lens common to both of said different locations for collection of said first and second divergent beams having parallel axes of symmetry exclusively in said lens, said common focusing lens having an optical axis parallel, at incidence, to said axes of symmetry and focusing said first and second beams, respectively, at first and second focus locations at different distances outward of said lens; and
    (e) sheet material transport means for advancing said sheet material past said focus locations in a plane location juxtaposed therewith so that successive confrontation of said light-reflective means with said focused beam results in spaced perforations in said sheet material.

11. The system of claim 10 including drive means for rotating said shaft, and spacer means for mutually separating said first and second discs along such shaft such that said reflective elements are moved into said mutually different locations along said beam axis upon such shaft rotation.

12. The system of claim 10 wherein said lens has a field of view inclusive of said mutually different locations.

* * * * *

UNITED STATES PATENT AND TRADEMARK OFFICE
CERTIFICATE OF CORRECTION

PATENT NO. : 4,410,785
DATED : October 18, 1983
INVENTOR(S) : Lilly, Jr. et al.

It is certified that error appears in the above-identified patent and that said Letters Patent are hereby corrected as shown below:

Cover page, under "References Cited" "Foreign Patent Documents", "2015813" should read -- 2015813A --.

Column 3, line 63, "original $36_o$" should read -- origin $36_o$ --.

Column 4, line 48, "region" should read -- origin --.

Column 5, line 67, the formula "N $D_4 = D_1$ cos Z + $_6$" should read -- N $D_4 = D_1$ cos Z + $D_6$ --.

Signed and Sealed this

Twenty-fifth Day of September 1984

[SEAL]

Attest:

GERALD J. MOSSINGHOFF

Attesting Officer

Commissioner of Patents and Trademarks